US005850392A

United States Patent [19]

Wang et al.

[11] Patent Number: 5,850,392
[45] Date of Patent: Dec. 15, 1998

[54] SPREAD SPECTRUM RANDOM ACCESS SYSTEMS AND METHODS FOR TIME DIVISION MULTIPLE ACCESS RADIOTELEPHONE COMMUNICATION SYSTEMS

[75] Inventors: Yi-Pin Eric Wang, Raleigh; Amer Hassan; Stanley L. Reinhold, both of Cary; Larry W. Massingill, Selma, all of N.C.

[73] Assignee: Ericsson Inc., Research Triangle Park, N.C.

[21] Appl. No.: 629,497

[22] Filed: Apr. 10, 1996

[51] Int. Cl.$^6$ .................................................. H04J 13/02
[52] U.S. Cl. ..................... 370/335; 370/337; 370/342; 370/347; 370/350; 370/514; 375/201
[58] Field of Search .................................. 370/320, 321, 370/322, 323, 324, 335, 336, 337, 342, 347, 441, 442, 437, 514, 515; 375/200, 201, 202, 203, 204, 205, 206, 207, 208, 209, 210, 365, 366, 367, 368

[56] References Cited

U.S. PATENT DOCUMENTS

| | | | |
|---|---|---|---|
| 3,818,453 | 6/1974 | Schmidt et al. | 340/172.5 |
| 4,555,782 | 11/1985 | Alaria et al. | |
| 5,172,375 | 12/1992 | Kou . | |
| 5,373,502 | 12/1994 | Turban | 370/441 |
| 5,481,533 | 1/1996 | Honig et al. | 375/206 |
| 5,533,013 | 7/1996 | Leppanen | 370/342 |
| 5,572,516 | 11/1996 | Miya et al. | 370/347 |
| 5,577,024 | 11/1996 | Malkamaki et al. | |
| 5,640,413 | 6/1997 | Ichihara | 375/200 |
| 5,663,990 | 9/1997 | Bolgiano et al. | 375/200 |

FOREIGN PATENT DOCUMENTS

| | | |
|---|---|---|
| 0 026 603 A1 | 4/1981 | European Pat. Off. . |
| 0 097 309 A2 | 1/1984 | European Pat. Off. . |
| 0 097 309 B1 | 11/1987 | European Pat. Off. . |
| 0 701 337 A2 | 3/1996 | European Pat. Off. . |
| 3644175 A1 | 7/1988 | Germany . |

| | | |
|---|---|---|
| WO 93/15573 | 8/1993 | WIPO . |

OTHER PUBLICATIONS

M. Mouly and M.B. Pautet, *The GSM System For Mobile Communications*, Radio Resource Management, 1992, pp. 368–372.

(List continued on next page.)

*Primary Examiner*—Jason Chan
*Assistant Examiner*—Huy D. Vu
*Attorney, Agent, or Firm*—Myers Bigel Sibley & Sajovec

[57] ABSTRACT

In a time division multiple access (TDMA) radiotelephone communications system, a spread spectrum random access channel signal representing a random access message is communicated from a radiotelephone to a central station according to a spreading sequence. In response, a TDMA radiotelephone communications channel is assigned to the radiotelephone. A time division multiplexed radiotelephone communications signal is communicated between the radiotelephone and the central station on the assigned TDMA radiotelephone communications channel over a time division multiplexed carrier frequency band. Preferably, in communicating the spread spectrum random access channel signal, a random access channel signal, representing the random access channel message, is direct sequence modulated according to the spreading sequence to produce a direct sequence modulated random access channel signal. According to a two-stage detection aspect, a synchronization sequence may be associated with a plurality of spreading sequences. The synchronization sequence may be first detected from the communicated spread spectrum random access channel signal, and in response to detection of the synchronization sequence, one of the plurality of spreading sequences associated with the detected synchronization sequence may be detected. A station identification may be assigned to the radiotelephone, with the station identification preferably represented by a digital station identification word. The synchronization sequence and the spreading sequence may be identified from the station identification word, thus associating the synchronization and spreading sequences. The spreading sequence may also be randomly generated from the station identification word.

4 Claims, 13 Drawing Sheets

OTHER PUBLICATIONS

Carlo Caini et al., *A Spectrum–and Power–Efficient EHF Mobile Satellite System to be Ingrated with Terrestial Cellular Systems*, IEEE Journal On Selected Areas In Communications, vol. 10, No. 8, Oct. 1992, pp. 1315–1325.

M. Kawai et al., *Randam TDMA Access Protocol with Application to Multi Beam Satelites*, IEEE International Conference on Communications, Conference Record Vol. 3 of 3, ICC'82 The Digital Revolution, ISSN 0536–1486, IEEE Catalog Number 82CH1766–5, Jun. 13–17, 1982, pp. 7F.3.1–7F.3.5.

Giuliano Benelli et al., *Integration of Random Access and TDMA Techniques in a Multibeam Satellite System*, IEEE Global Telecommunications Conference, Conference Record vol. 2 of 3, "Communications In The Information Age", IEEE #84CH2064–4, LC84–81785, Nov. 26–29, 1984, pp. 28.7.1–28.7.4.

U.S. Patent Application Serial No. 08/626182, filed Mar. 29, 1996, entitled "*Circuit and Method for Initiating Communication Between Communication Stations of a Radio Communication System*".

PCT International Search Report , PCT/US97/05584, Oct. 02, 1997.

RACH Burst

Information Sequence

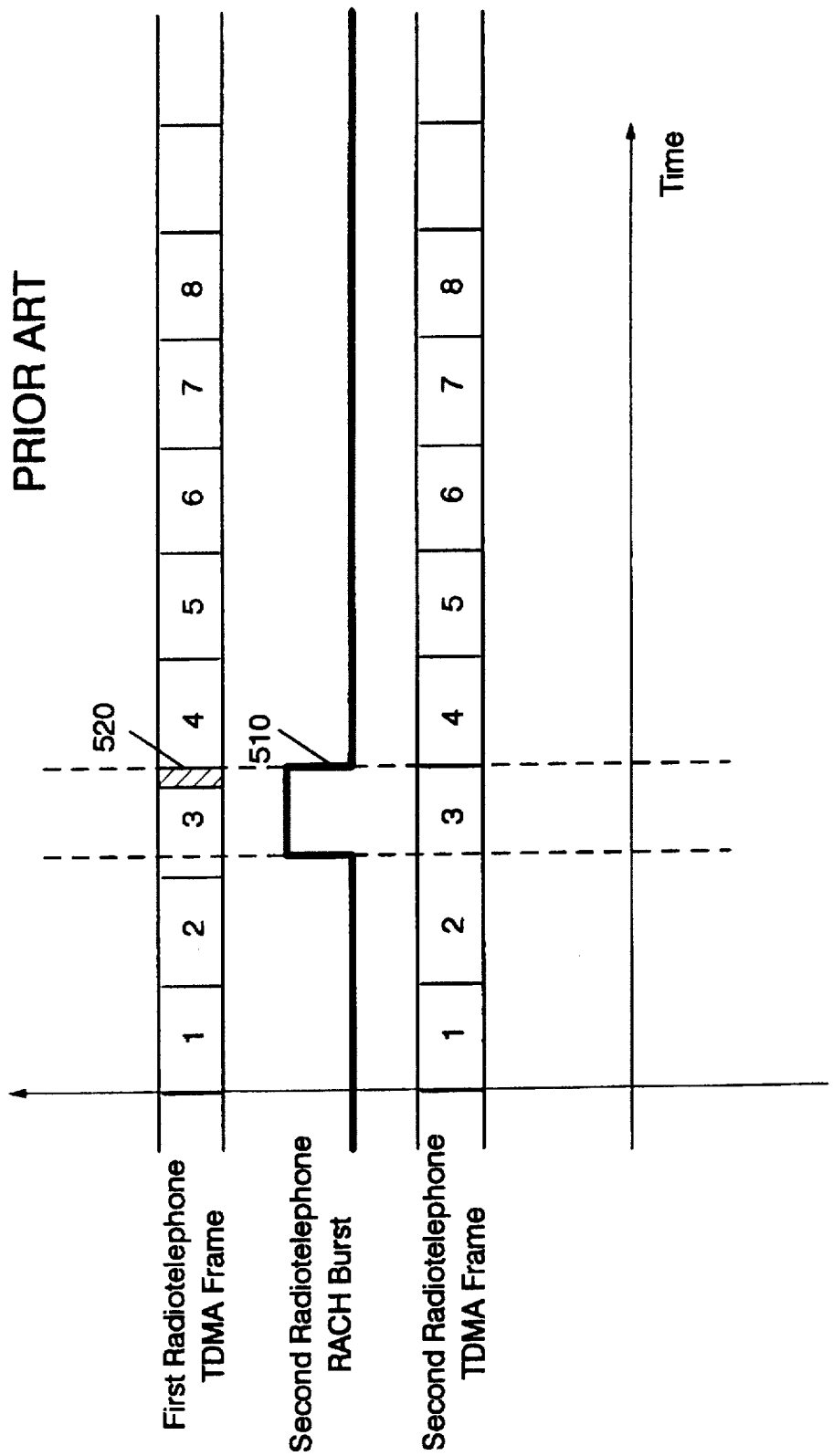

SPREAD SPECTRUM RANDOM ACCESS SYSTEMS AND METHODS FOR TIME DIVISION MULTIPLE ACCESS RADIOTELEPHONE COMMUNICATION SYSTEMS

FIELD OF THE INVENTION

The present invention relates to communications systems and methods, in particular, to radiotelephone communications systems and methods.

BACKGROUND OF THE INVENTION

Cellular radiotelephone systems are commonly employed to provide voice and data communications to a plurality of subscribers. For example, analog cellular radiotelephone systems, such as designated AMPS, ETACS, NMT450, and NMT-900, have been deployed successfully throughout the world. More recently, digital cellular radiotelephone systems such as designated IS-54B in North America and the pan-European GSM system have been introduced. These systems, and others, are described, for example, in the book titled *Cellular Radio Systems* by Balston, et al., published by Artech House, Norwood, Mass., 1993.

FIG. 1 illustrates a typical terrestrial cellular radiotelephone communication system 20 as in the prior art. The cellular radiotelephone system may include one or more radiotelephones 21, communicating with a plurality of cells 36 served by base stations 23 and a mobile telephone switching office (MTSO) 25. Although only three cells 36 are shown in FIG. 1, a typical cellular network may comprise hundreds of cells, may include more than one MTSO, and may serve thousands of radiotelephones.

The cells 36 generally serve as nodes in the communication system 20, from which links are established between radiotelephones 21 and the MTSO 25, by way of the base stations 23 serving the cells 36. Each cell will have allocated to it one or more dedicated control channels and one or more traffic channels. The control channel is a dedicated channel used for transmitting cell identification and paging information. The traffic channels carry the voice and data information. Through the cellular network 20, a duplex radio communication link 32 may be effected between two mobile stations 21 or between a radiotelephone 21 and a landline telephone user 33. The function of the base station 23 is commonly to handle the radio communication between the cell and the mobile station 21. In this capacity, the base station 23 functions chiefly as a relay station for data and voice signals.

As illustrated in FIG. 2, satellites 110 may be employed to perform similar functions to those performed by base stations in a conventional terrestrial radiotelephone system, for example, in areas where population is sparsely distributed over large areas or where rugged topography tends to make conventional landline telephone or terrestrial cellular telephone infrastructure technically or economically impractical. A satellite radiotelephone system 100 typically includes one or more satellites 110 which serve as relays or transponders between one or more earth stations 130 and radiotelephones 21. The satellite communicates with radiotelephones 21 and earth stations 130 over duplex links 170. The earth station may in turn be connected to a public switched telephone network 30, allowing communications between satellite radiotelephones, and communications between satellite radio telephones and conventional terrestrial cellular radiotelephones or landline telephones. The satellite radiotelephone system may utilize a single antenna beam covering the entire area served by the system, or, as shown, the satellite may be designed such that it produces multiple minimally-overlapping beams 150, each serving distinct geographical coverage areas 160 in the system's service region. A satellite 110 and coverage area 160 serve functions similar to that of a base station 23 and cell 36, respectively, in a terrestrial cellular system.

Traditional analog radiotelephone systems generally employ a system referred to as frequency division multiple access (FDMA) to create communications channels. As a practical matter well-known to those skilled in the art, radiotelephone communications signals, being modulated waveforms, typically are communicated over predetermined frequency bands in a spectrum of carrier frequencies. These discrete frequency bands serve as channels over which cellular radiotelephones communicate with a cell, through the base station or satellite serving the cell. In the United States, for example, Federal authorities have allocated to cellular communications a block of the UHF frequency spectrum further subdivided into pairs of narrow frequency bands, a system designated EIA-553 or IS-19B. Channel pairing results from the frequency duplex arrangement wherein the transmit and receive frequencies in each pair are offset by 45 Mhz. At present there are 832, 30-Khz wide, radio channels allocated to cellular mobile communications in the United States.

The limitations on the number of available frequency bands presents several challenges as the number of subscribers increases. Increasing the number of subscribers in a cellular radiotelephone system requires more efficient utilization of the limited available frequency spectrum in order to provide more total channels while maintaining communications quality. This challenge is heightened because subscribers may not be uniformly distributed among cells in the system. More channels may be needed for particular cells to handle potentially higher local subscriber densities at any given time. For example, a cell in an urban area might conceivably contain hundreds or thousands of subscribers at any one time, easily exhausting the number of frequency bands available in the cell.

For these reasons, conventional cellular systems employ frequency reuse to increase potential channel capacity in each cell and increase spectral efficiency. Frequency reuse involves allocating frequency bands to each cell, with cells employing the same frequencies geographically separated to allow radiotelephones in different cells to simultaneously use the same frequency without interfering with each other. By so doing, many thousands of subscribers may be served by a system of only several hundred frequency bands.

Another technique which may further increase channel capacity and spectral efficiency is time division multiple access (TDMA). A TDMA system may be implemented by subdividing the frequency bands employed in conventional FDMA systems into sequential time slots, as illustrated in FIG. 3. Although communication on frequency bands $f_1-f_m$ typically occur on a common TDMA frame 310 that includes a plurality of time slots $t_1-t_n$, as shown, communications on each frequency band may occur according to a unique TDMA frame, with time slots unique to that band. Examples of systems employing TDMA are the dual analog/digital IS-54B standard employed in the United States, in which each of the original frequency bands of EIA-553 is subdivided into 3 time slots, and the European GSM standard, which divides each of its frequency bands into 8 time slots. In these TDMA systems, each user communicates with the base station using bursts of digital data transmitted during the user's assigned time slots. A channel in a TDMA system typically includes one or more time slots on one or more frequency bands.

Because it generally would be inefficient to permanently assign TDMA time slots to a radiotelephone, typical radiotelephone systems assign time slots on an as-needed basis to more efficiently use the limited carrier frequency spectrum available to the system. Therefore, a critical task in radiotelephone communications is providing a radiotelephone with access to the system, i.e., assigning time slots corresponding to a voice or data channel to a radiotelephone when it desires to communicate with another radiotelephone or with a landline telephone or conventional cellular radiotelephone via the PSTN. This task is encountered both when a radiotelephone attempts to place a call and when a radiotelephone attempts to respond to a page from another radiotelephone or conventional telephone.

Access to a radiotelephone communications system may be provided in a number of ways. For example, a polling technique may be utilized whereby a central or base station serially polls users, giving each an opportunity to request access in an orderly fashion, without contention. However, serial polling tends to be impractical for radiotelephone systems because typical radiotelephone systems may have hundreds, if not thousands, of users. Those skilled in the art will appreciate that serially polling this many users can be extremely inefficient, especially when one considers that many of the users may not desire access at all, or may not desire access at the particular moment they are polled.

For this reason, radiotelephone systems typically use random access techniques, whereby a radiotelephones desiring a voice or data channel randomly sends an access request to the base or hub station, which the central or base station acknowledges by establishing a communications channel to the requesting radiotelephone, if available. An example of a random access technique for a TDMA radiotelephone communications system is that used in the GSM system. In the GSM system, a set of Common Control Channels (CCCHs) is shared by radiotelephones in the system and includes one or more Random Access Channels (RACHs).

Radiotelephones typically monitor the status of the RACH to determine whether other radiotelephones are currently requesting access. If a radiotelephone desires access and senses that the RACH is idle, the radiotelephone typically transmits a random access channel signal, typically including the radiotelephone's identification and an identification of the telephone the radiotelephone desires to contact, in what is often referred to as a "RACH burst." As illustrated in FIG. 4, a RACH burst 410 typically contains several fields, including a plurality of guard bits 420, a sequence of synchronization bits 430, and a sequence of information bits 440. The guard bits 420 are used to prevent overlap of communications occurring on adjacent time slots, as discussed below. The synchronization sequence 430 is used by the receiving station to synchronize with the RACH burst, in order to decode the information contained in the information sequence 440. The information sequence 440 may also include a number of sub-fields, for example, a random reference number field 450 which serves as a "tag" for identifying a particular random access request from a particular radiotelephone.

In a GSM system, a RACH is a dedicated TDMA time slot on a carrier frequency band, used by radiotelephones to request access to the communications system. Radiotelephones typically time their RACH bursts to fall within an assigned TDMA time slot for the RACH, for example, by waiting a predetermined period after a transition in a synchronization signal transmitted by the base station and then transmitting the RACH burst. However, because radiotelephones conventionally use a common TDMA time slot for transmitting RACH burst, there is probability of collisions between access requests which are transmitted simultaneously or nearly simultaneously by neighboring radiotelephones. To deal with these collisions, the base station typically implements some form of contention-resolving protocol. For example, the station may refuse to acknowledge simultaneous requests, requiring a requesting radiotelephone to reassert its request if it continues to desire access after failing to establish a channel. Contention-resolving protocols may also use a variety of predetermined delays and similar techniques to reduce the likelihood of radiotelephones engaging in repeated collisions subsequent to a first collision. Contention logic used in the European GSM system is described in *The GSM System for Mobile Communications* published by M. Mouly and M. B. Pautet, 1992, at pages 368–72. Although these contention-resolving protocols may compensate for access failures, they typically do so by incurring additional transmission and processing overhead.

In addition to colliding with other RACH bursts, a RACH burst may overlap other TDMA time slots, causing undue interference on channels using those slots. Before requesting a channel, a radiotelephone may be only roughly synchronized with the base station TDMA frame, for example, by aligning its internal time reference with the synchronization signal transmitted by the base station in an open loop fashion. Finer synchronization, however, typically occurs only after the base station acknowledges the radiotelephone's request for access and provides the radiotelephone with signals which allow the propagation delay between the radiotelephone and the station to be determined. With this information, the radiotelephone can adjust its TDMA bursts to prevent collision with bursts from other radiotelephones arriving at the base station on adjacent TDMA slots.

However, a radiotelephone requesting access prior to such synchronization generally suffers from a time ambiguity with respect to other TDMA bursts in the system, because propagation delay varies with position in the coverage area. FIG. 5 illustrates timing relationships between a first radiotelephone, closely synchronized and communicating with the base station over a TDMA voice channel, and a second radiotelephone located a distance from the base station which desires access to system. Because the second radiotelephone is only roughly synchronized, its internal timing may be significantly skewed with respect to the TDMA frame of the base station, as illustrated. Uncompensated, this time skew may cause, for example, a RACH burst 510 transmitted by the second radiotelephone to have a significant overlap 520 with voice or data communications transmitted by the first radiotelephone on an adjacent time slot. This overlap may cause undesirable interference and diminish communications quality.

As illustrated in FIG. 6, conventional terrestrial TDMA cellular radiotelephone systems may compensate for this problem by incorporating guard time or guard bits 610 in each TDMA slot, typically preceding data bits 620 which carry synchronization, voice, data or other information. Guard bits are inserted in each time slot, during which the receiving unit disregards incoming signals because they may be corrupted by overlapping RACH bursts and other sources of interference. Because the maximum time ambiguity in a terrestrial radiotelephone system tends to be relatively small with respect to a TDMA frame, the number of guard bits needed to ensure acceptable signal quality typically is small.

For example, the GSM system incorporates approximately 68.25 guard bits in each time slot to ensure that RACH bursts from a radiotelephones as far as 35 kilometers away from the base station will not cause undue interference on other TDMA slots.

Using guard times or bits to prevent overlap of RACH bursts tends to be impractical for satellite TDMA radiotelephone systems, however, because the large area covered by a typical satellite beam and the large distance from the satellite to the radiotelephone can combine to create time ambiguities far larger than those experienced in conventional terrestrial TDMA cellular radiotelephone systems. For example, a radiotelephone communications signal in a satellite beam having a coverage area of an approximate 500 kilometer radius may have a differential propagation delay approaching 6 milliseconds for a radiotelephone located at the periphery of the coverage area, resulting in a comparable time ambiguity for RACH bursts. As a typical TDMA time frame may be only tens of milliseconds long and have a slot length of only a few microseconds, the number of guard bits needed to prevent interference from unsynchronized RACH bursts can be of a magnitude approaching the duration of an entire TDMA frame, and far longer than an individual time slot. Increasing the TDMA frame length and the time slot length to provide a sufficient number of guard bits generally is not a practical alternative, as this approach would tend to reduce the potential information rate of the communications channels.

A technique for providing access to a TDMA satellite radiotelephone communications system has been proposed in U.S. patent application Ser. No. 08/629,358, entitled "Systems and Methods for Random Access in Time Division Multiple Access Satellite Radiotelephone Communications", to Hassan et al., filed Apr. 8, 1996, assigned to the assignee of the present invention, which includes using a dedicated carrier frequency band to communicate random access channel radiotelephone communications signals. Although this approach avoids the time slot overlap problems associated with using a time slot to transmit a RACH burst, access request collisions may still occur when two radiotelephones transmit RACH signals simultaneously on the same carrier frequency band, a probability which increases as number of radiotelephones using a particular cell increases. Using dedicated bands for random access channels also may not result in efficient use of the available carrier frequency spectrum, as there may be significant periods of time during which no random access signal transmissions are occurring on the dedicated bands, potentially wasting capacity which could be utilized for other channels.

SUMMARY OF THE INVENTION

In the light of the foregoing, it is an object of the present invention to provide systems and methods for access to a time division multiple access (TDMA) radiotelephone communications system which is less vulnerable to time ambiguity in random access requests.

It is another object of the present invention to provide radiotelephone random access systems and methods which reduce interference of random access channel messages with voice, data and other channels communicated using TDMA time slots.

It is another object of the present invention to provide radiotelephone random access systems and methods which reduce the probability of access failures.

It is another object of the present invention to provide radiotelephone random access systems and methods which efficiently utilize spectral capacity.

These and other objects, advantages and features are provided by a time division multiple access radiotelephone communications system in which a random access channel message, used to request a time multiplexed channel, is communicated from a radiotelephone to a central station, such as a conventional cellular base station or a satellite, using code division multiple access techniques. A spread spectrum random access channel radiotelephone communications signal representing the random access channel message is communicated over the carrier frequency spectrum used by the system according to a spreading sequence, preferably using direct sequence modulation. Timing of the sequence used to represent the random access message may be determined when the spreading sequence is detected, eliminating the need to transmit another synchronization sequence in the random access channel message, and allowing message length to be reduced.

Alternatively, according to a two-stage detection aspect which may simplify random access channel acquisition, groups of spreading sequences may be associated with synchronization sequences which are included in the random access message, allowing a receiving station to correlate a lower number of lower-order synchronization codes with a received spread spectrum signal to detect the presence of a random access channel message. After a synchronization code is detected, the received signal may then be correlated against the corresponding subset of spreading sequences. The spreading and synchronization sequences may be derived from a station identification associated with the radiotelephone. In addition, a portion of the station identification may be used as a seed for a random number generator which generates a spreading sequence.

Using spread spectrum techniques to communicate random access channel messages according to the present invention can reduce and preferably eliminate the overlap and collision problems associated with using a dedicated frequency band or time slot for communicating random access channel messages. As random access channel signals are spread across the carrier frequency spectrum used by the system, the probability of interference with any one TDMA channel, or with another random access channel, can be kept to an acceptable level. Using the station identification to identify the spreading sequence provides an effective and efficient way to randomize the distribution of spreading sequences and thus further reduce the probability of collision or other unacceptable interference. Associating synchronization and spreading sequences can reduce the complexity of the hardware and software in the receiving station, and aid acquisition of a random access channel. Using the station identification as a seed for randomly generating the spreading code can make it more difficult for unauthorized parties to decode the station identification from an intercepted spread spectrum random access channel communications signal, potentially enhancing system security.

In particular, in a time division multiple access (TDMA) radiotelephone communications system according to the present invention, code division multiple access (CDMA) random access channel communicating means communicates a spread spectrum random access channel signal from a radiotelephone to a central station over the carrier frequency spectrum used by the system, according to a spreading sequence. The spread spectrum random access channel signal represents a random access message, for example, a request for a TDMA radiotelephone communications channel. Time division multiple access (TDMA) communicating means communicates a time division multiplexed radiotelephone communications signal between the radiotelephone and the central station on the assigned TDMA communications channel over a time division multiplexed carrier frequency band of the carrier frequency spectrum, the time division multiplexed radiotelephone communications signal representing a radiotelephone communications message.

The CDMA random access channel communicating means preferably modulates a random access channel signal according to the spreading sequence, the random access channel signal representing the random access channel message. More preferably, the random access channel signal is direct sequence modulated according to the spreading sequence to produce a direct sequence modulated random access channel signal. The random access channel signal may represent a random access channel symbol sequence representing the random access channel message. Spreading sequence detecting means may detect the spreading sequence from the communicated spread spectrum random access channel signal representing the random access channel symbol sequence, and also may determine a sequence timing associated with the detected spreading sequence. Random access channel symbol sequence determining means, responsive to the spreading sequence detecting means, may determine the random access channel symbol sequence from the determined sequence timing. Thus, the spreading sequence may be used to determine the timing of the random access channel symbol sequence, without including a synchronization sequence in the random access channel symbol sequence.

A station identification may be assigned to the radiotelephone, and spreading sequence identifying means, responsive to means for assigning the station identification, may identify a spreading sequence based on the assigned station identification. The spread spectrum random access channel signal communicating means may communicate a spread spectrum random access channel signal over the carrier frequency spectrum according to the identified spreading sequence. The station identification may include a station identification word, and spreading sequence generating means may generate a spreading sequence from a group of bits of the station identification word. The spreading sequence generating means may also randomly generate the spreading sequence from the group of bits of the station identification word.

According to a two-stage detection aspect, the CDMA random access channel communicating means may associate a synchronization sequence with a plurality of spreading sequences. The CDMA random access channel communicating means may communicate a spread spectrum random access channel signal representing a random access channel symbol sequence including a synchronization sequence, according to one of the plurality of spreading sequences associated with the synchronization sequence. Synchronization sequence detecting means may detect a synchronization sequence from the communicated spread spectrum random access channel signal, and spreading sequence detecting means, responsive to the synchronization sequence detecting means, may detect one of the plurality of spreading sequences associated with the detected synchronization sequence from the communicated spread spectrum random access channel signal. In this manner, the spreading sequence is detected after an initial detection of the synchronization sequence, allowing the number of sequences with which the communicated spread spectrum random access channel signal is correlated to be reduced.

A station identification may be assigned to the radiotelephone and synchronization sequence identifying means, responsive to the means for assigning a station identification, may identify a synchronization sequence from the assigned station identification. Similarly, spreading sequence identifying means, responsive to the means for assigning a station identification, may identify a spreading sequence from the assigned station identification, thus associating the synchronization and spreading sequences.

For example, the station identification may include a station identification word, and the spreading sequence identifying means may identify the spreading sequence from a group of bits of the station identification word, with the synchronization sequence identifying means identifying the synchronization sequence from a subset of the group of bits of the station identification word.

Spreading sequence detecting means may detect a spreading sequence from the communicated spread spectrum random access channel radiotelephone communication signal. Random access channel message acknowledging means, responsive to the spreading sequence detecting means, may acknowledge the communicated random access channel message with an acknowledgement message corresponding to the detected spreading sequence. Accordingly, a random access channel message may be acknowledged based on its spreading sequence, without requiring a reference number to be included in the random access message. Eliminating the need for a reference number can further reduce message overhead.

These and other means may be used to perform the corresponding methods claimed herein. These methods include communicating a spread spectrum random access channel signal from a radiotelephone to central station according to a spreading sequence, assigning a TDMA radiotelephone communications channel to the radiotelephone in response, and communicating a time division multiplexed radiotelephone communications signal between the radiotelephone and the central station on the assigned channel over a time division multiplexed carrier frequency band. Preferably, communicating a spread spectrum random access channel signal includes direct sequence modulating a random access channel signal according to the spreading sequence. The random access channel signal may represent a random access channel symbol sequence, and the step of communicating a spread spectrum random access channel signal may be followed by the step of detecting a spreading sequence from the communicated spread spectrum random access channel signal. The step of detecting the spreading sequence may also include determining a sequence timing which may be used in a step of determining the random access channel symbol sequence from the spread spectrum random access channel signal. The step of detecting the spreading sequence may be followed by the step of acknowledging the communicated signal with an acknowledgement message corresponding to the detected spreading sequence.

Synchronization and spreading sequences may be associated and, in a two stage detect aspect, the step of detecting a synchronization sequence in a communicated spread spectrum random access channel signal may be followed by the step of detecting one of the spreading sequences associated with the detected synchronization sequence. The step of communicating a spread spectrum random access channel signal may be preceded by steps of identifying the spreading and synchronization sequences from a station identification assigned to the radiotelephone. The step of identifying a spreading sequence may include the step of randomly generating a spreading sequence from a station identification word.

The present invention provides systems and methods which communicate a random access channel message using CDMA, i.e., spread spectrum, techniques which are less susceptible to random access request collisions and may reduce or avoid the time slot overlap problems associated with conventional random access techniques. Spread spectrum techniques spread the random access channel signals over the spectrum used by the radiotelephone communications system, randomizing interference with TDMA communications on frequency bands and allowing multiple random access requests to be simultaneously communicated without unacceptable interference with one another. Using a station identification to generate the spreading sequence can randomize the allocation of spreading sequences, which may further decrease the probability of unacceptable co-channel interference between random access channels. To simplify random access messages, the synchronization sequence and reference number conventionally included in the message may be eliminated. If a synchronization sequence is included in random access messages, however, the sequence may be used in a two-stage detection process which can makes random access channel acquisition less complex.

BRIEF DESCRIPTION OF THE DRAWINGS

Some of the objects and advantages of the present invention having been stated, others will be more fully understood from the detailed description that follows and by reference to the accompanying drawings in which:

FIG. 5 illustrates timing relationships for random access channel bursts in a TDMA radiotelephone communications system according to the prior art;

DETAILED DESCRIPTION OF ILLUSTRATED EMBODIMENTS

Figure 1:
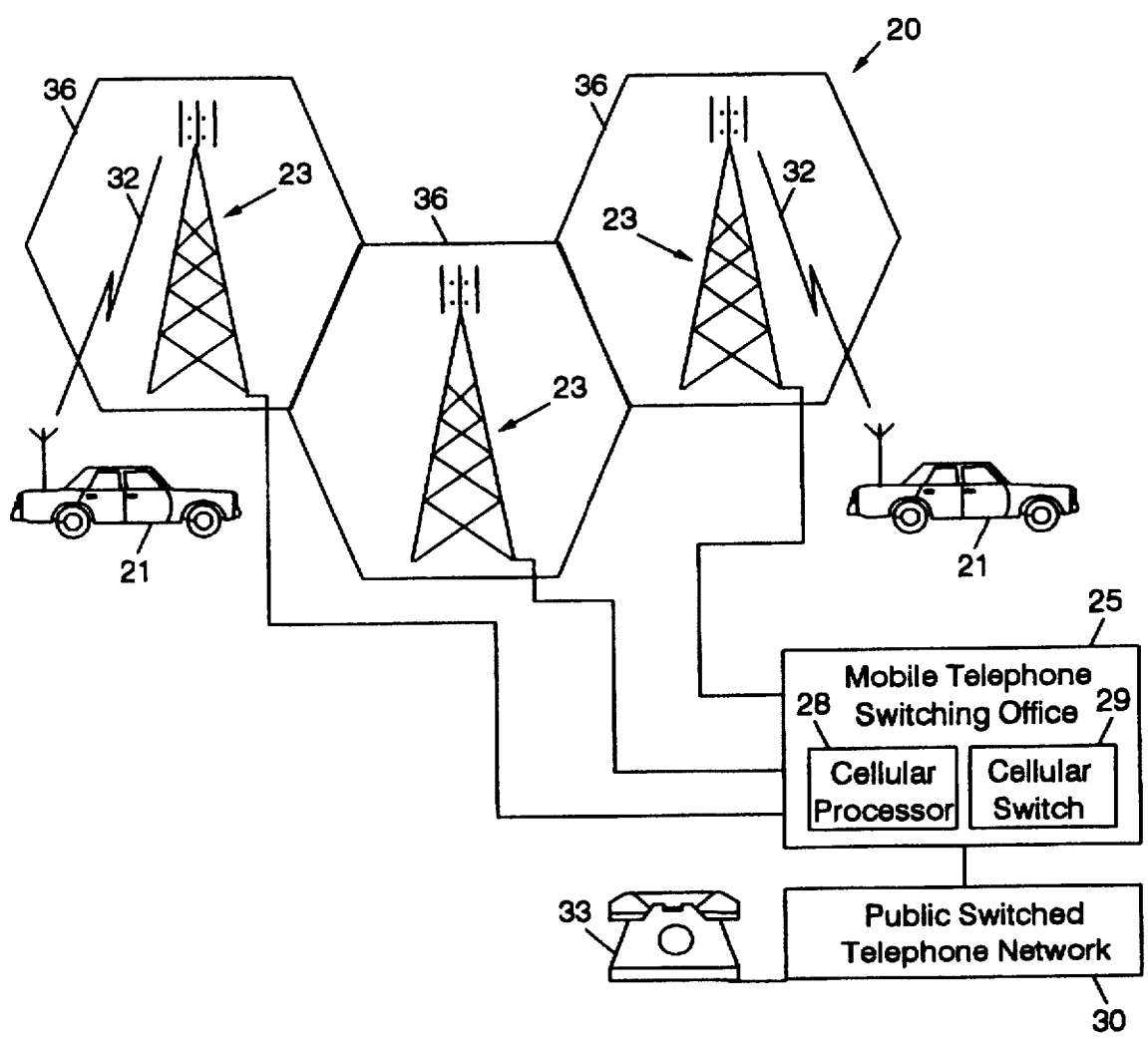
FIG. 1 illustrates a terrestrial cellular radiotelephone communications systems according to the prior art.
Figure 2:
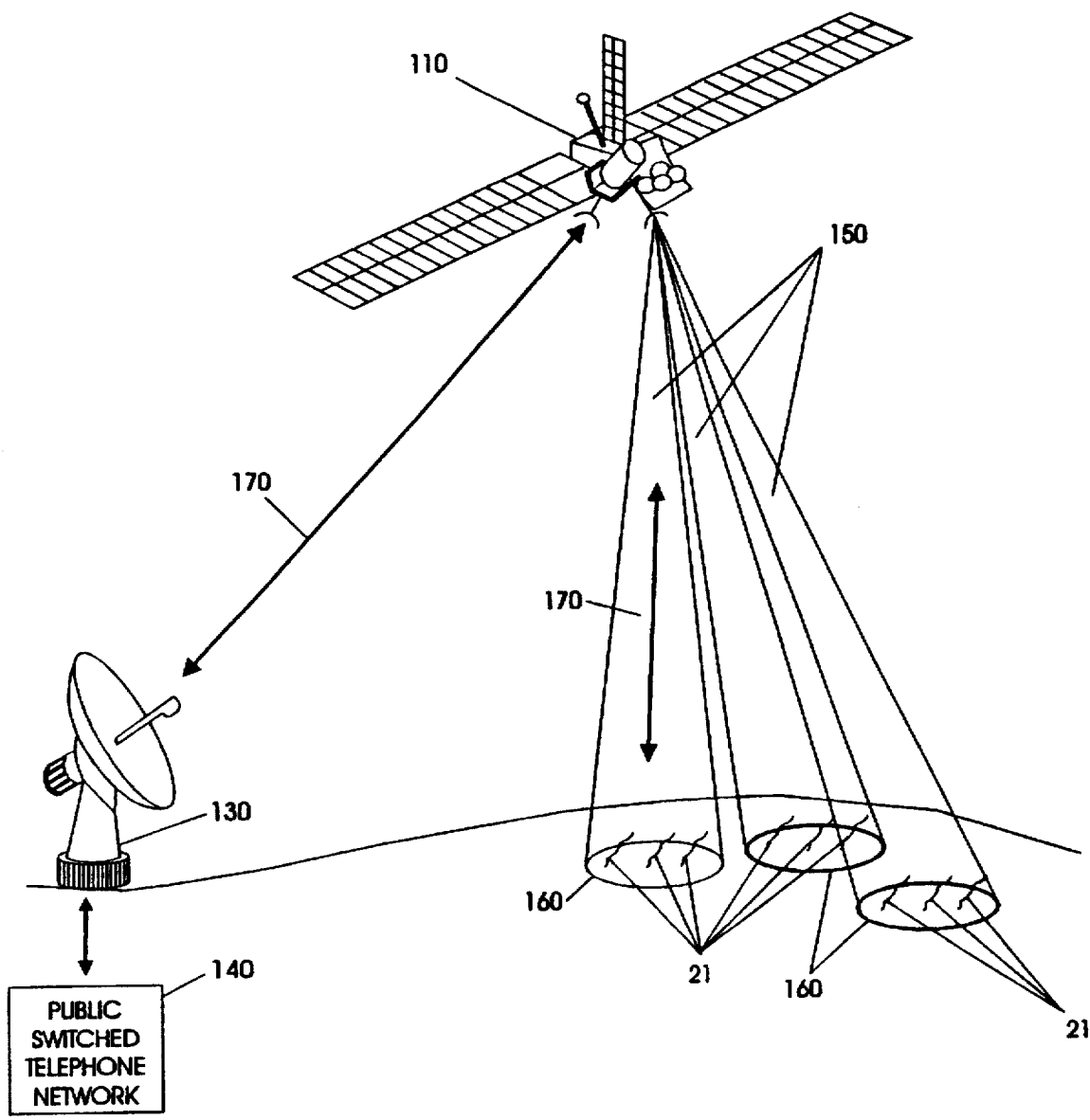
FIG. 2 illustrates a satellite radiotelephone communications system according to the prior art.
Figure 3:
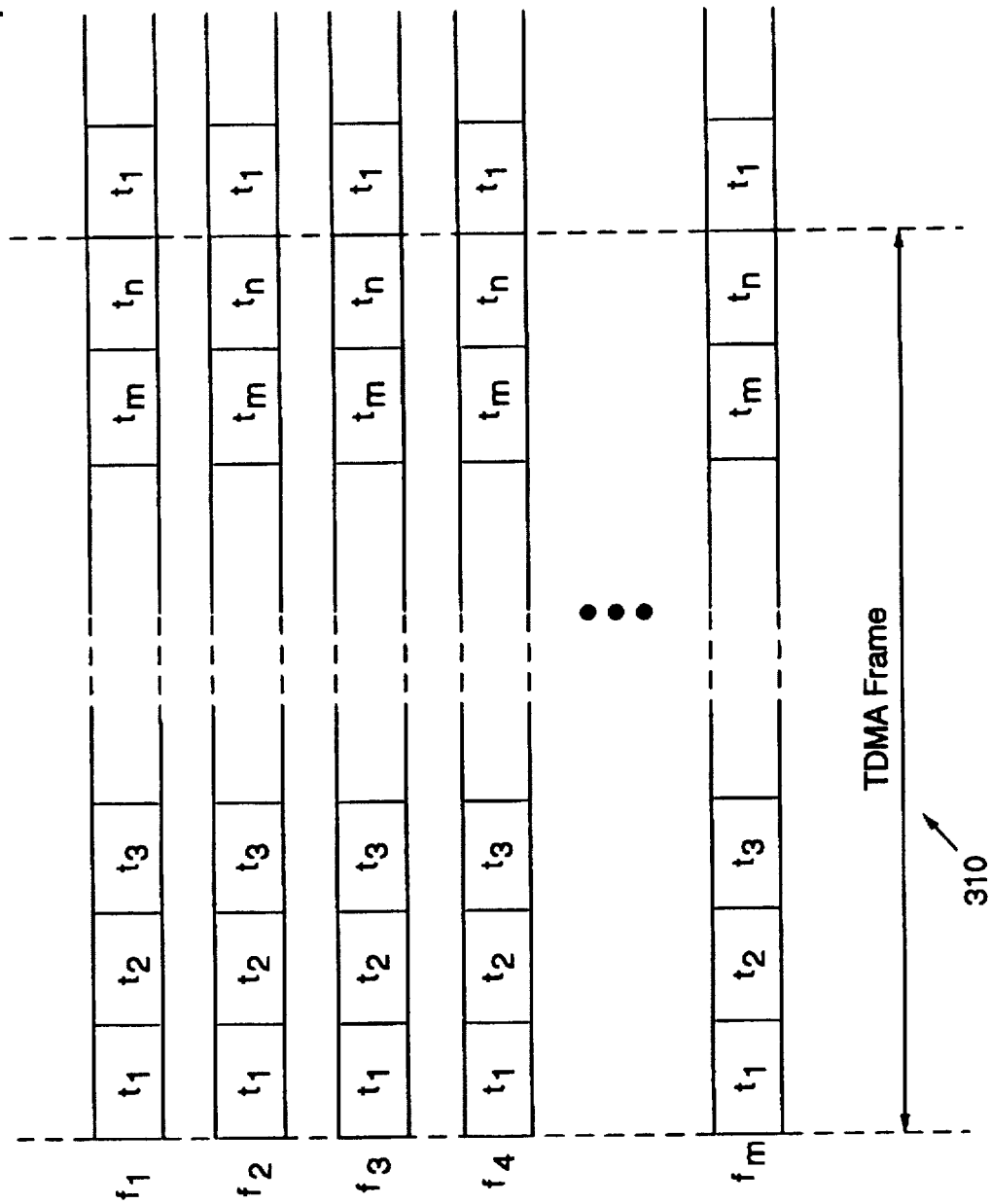
FIG. 3 illustrates allocation of a carrier frequency spectrum for a radiotelephone communications system according to the prior art.
Figure 4A:
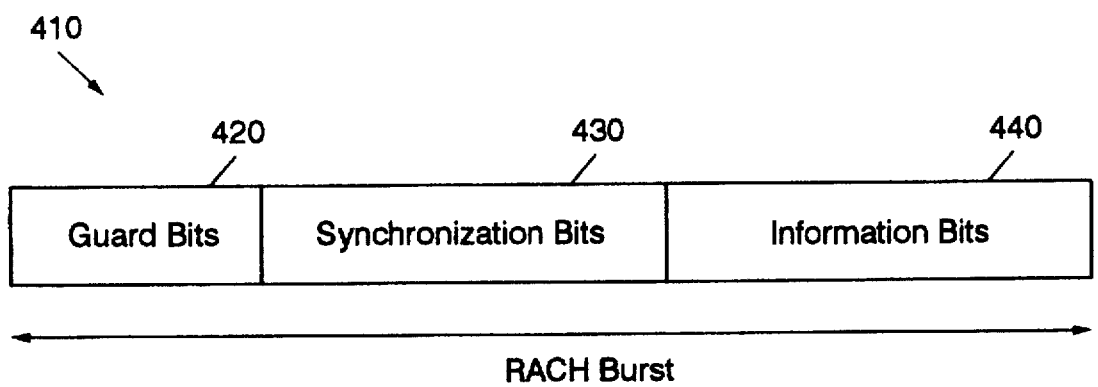
FIGS. 4A–4B illustrate time slots and frames utilized in a TDMA radiotelephone communications system according to the prior art.
Figure 4B:
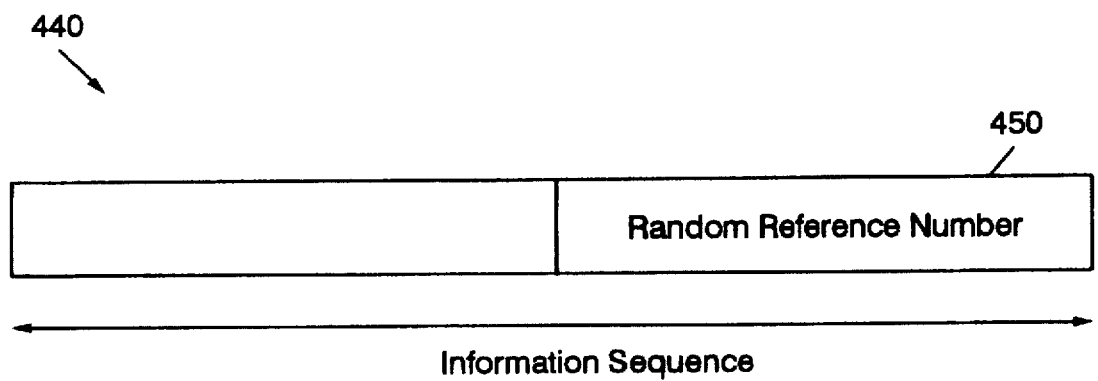
Figure 6:
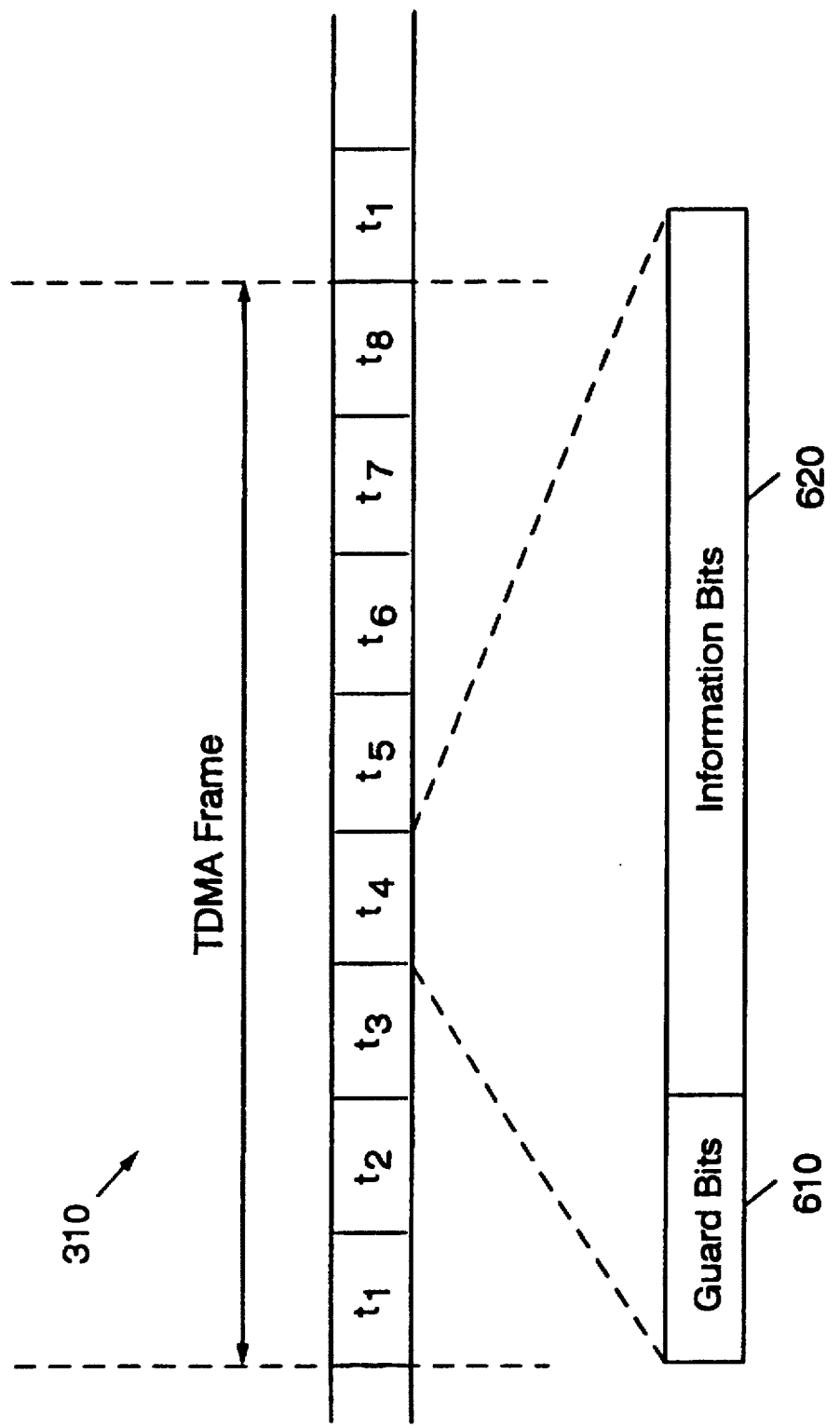
FIG. 6 illustrates bit allocations in a TDMA time slot of a TDMA radiotelephone communications system according to the prior art.

The present invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements throughout.

Figure 7:
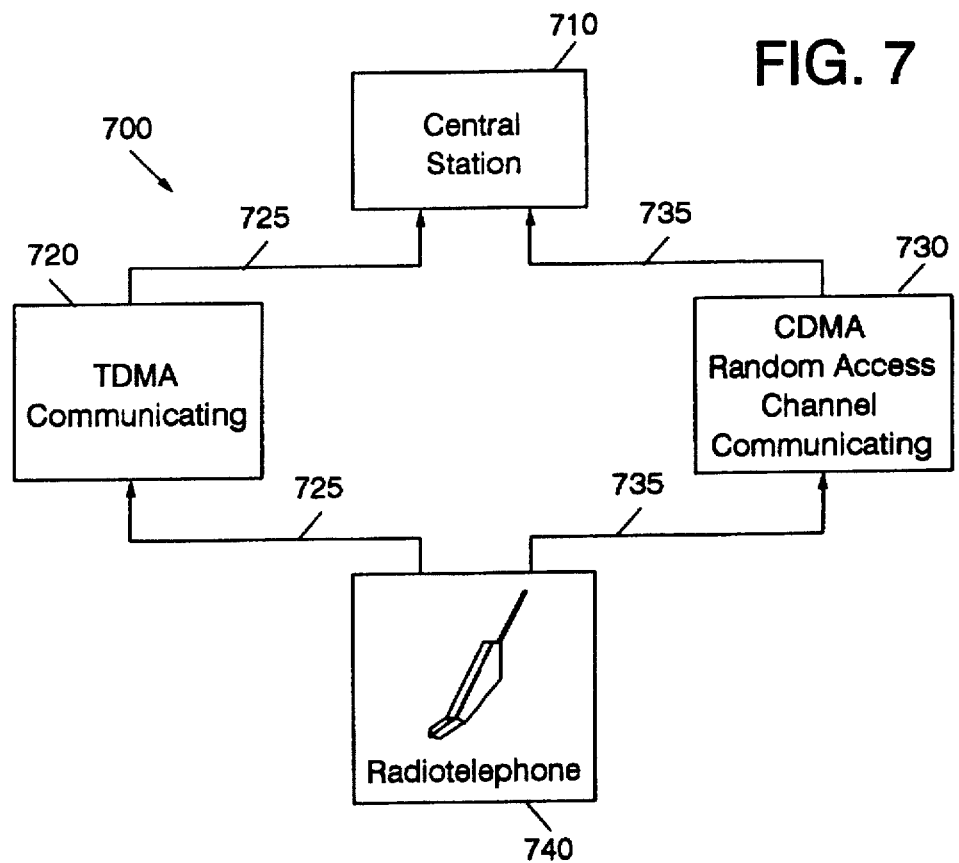
FIG. 7 illustrates a TDMA radiotelephone communications system according to the present invention.

Referring to FIG. 7, a radiotelephone communications system 700 according to the present invention includes code division multiple access (CDMA) random access channel communicating means 730 for communicating a spread spectrum random access channel signal 735 from a radiotelephone 740 to a central station 710 over the carrier frequency spectrum used by the system 700 according to a spreading sequence. The system 700 also includes time division multiple access (TDMA) communicating means 720 for communicating a time division multiplexed radiotelephone communications signal 724 from the radiotelephone 740 to the central station 710 over a time division multiplexed carrier frequency band of the carrier frequency spectrum used by the system 700, the time division multiplexed radiotelephone communications signal 725 representing a radiotelephone communications message. Those skilled in the art will understand that the central station 710 may be a radiotelephone network element such as a cellular base station, satellite or other component which serves as a node in the radiotelephone network through which radiotelephones 740 gain access for the purpose of communicating with other radiotelephones, landline telephones, and the like. Those skilled in the art will also understand that the radiotelephone 740 may include a conventional voice radiotelephone, personal communication terminal, or other subscriber terminal in the radiotelephone system 700, communicating voice, data and other radiotelephone communications messages to other subscriber terminals in the system. These radiotelephone communications messages are communicated between the radiotelephone 740 and the central station 710 using TDMA communicating means 720, the TDMA communications occurring by way of signal bursts communicated over at least one time division multiplexed carrier frequency band during one or more time slots.

As will be understood by those skilled in the art, CDMA communications typically involve the "spreading" of radiotelephone communications signals by modulating a data-modulated carrier according to a predetermined spreading sequence or code. Various modulation techniques may be employed, such as directly modulating a data signal by a differential binary signal corresponding to the spreading sequence (direct sequence modulation), periodically changing the carrier frequency used to transmit the data signal according to the spreading sequence (frequency hopping), and combinations thereof. As is well-known, these techniques produce a radiotelephone communications signal having a spectrum which is spread across the carrier frequency spectrum used by the system. The transmitted signal is successfully decoded by a receiving station which demodulates the transmitted system according to the same sequence, i.e., "despreads" the received signal. Thus, those skilled will in the art will understand that CDMA random access channel communicating means 730 preferably includes components which perform generating, transmitting, receiving, and processing functions related to such spread spectrum radiotelephone communications, as discussed below.

Figure 8:
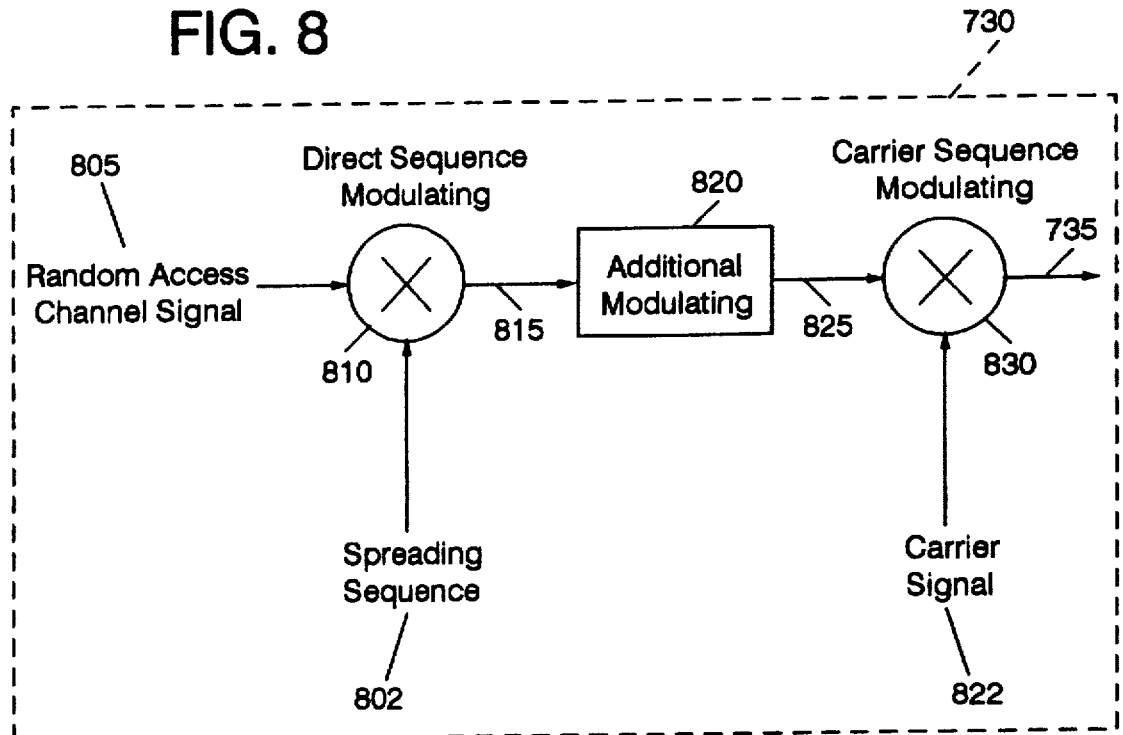
FIG. 8 illustrates modulation of a random access channel signal by a spreading sequence according to the present invention.

With respect to generating and transmitting functions, as illustrated in FIG. 8, CDMA random access channel communicating means 730 preferably includes direct sequence modulating means 810 for modulating a random access channel signal 805, representing a random access channel message, by the spreading sequence 802 to produce a direct sequence modulated random access channel signal 815. Direct sequence modulating techniques are well-known to those skilled in the art, and need not be discussed in further detail herein. Those skilled in the art will understand that various other modulation and other signal processing components may be included in the CDMA random access channel signal communicating means 730, such as additional modulating means 820, for example, a minimum shift keying (MSK) or other modulator, and carrier frequency modulating means 830, which modulates a carrier signal 822 with a modulated random access channel signal 825 to produce a spread spectrum random access channel communications signal 735 which may be transmitted to a central station 710. Those skilled in the art will understand that the TDMA communicating means 720 and the CDMA random access channel communicating means 730 may include such elements as digital signal processors, mixers, analog and digital filters, transmitters, antennas and the like. Those skilled in the art will also understand that any or all of the TDMA communicating means 720, the CDMA random access channel communicating means 730, and other means for performing the communicating and related steps described above may be implemented in special purpose analog or digital hardware, software running on general purpose processors, or combinations thereof.

Figure 9:
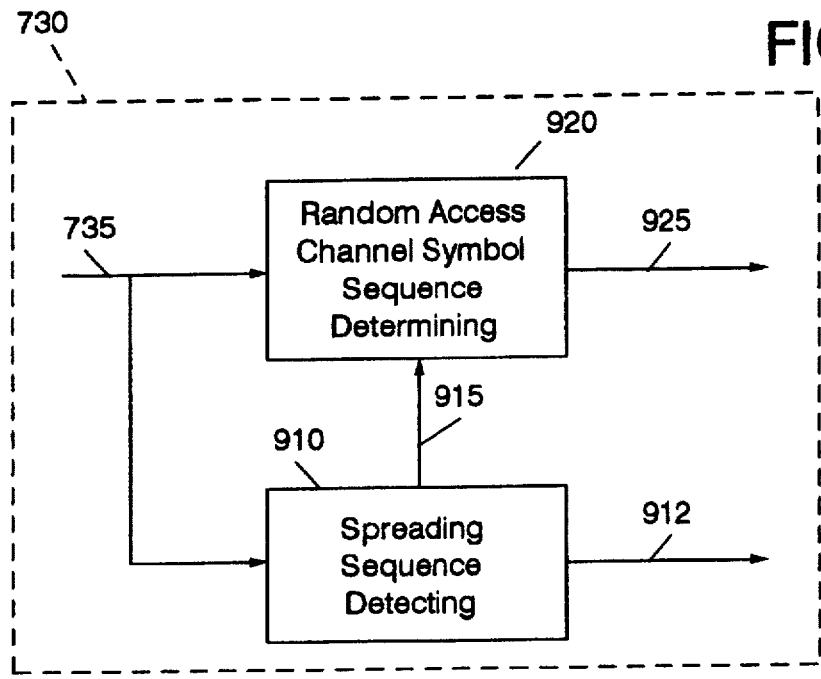
FIG. 9 illustrates determination of random access channel symbol sequence timing from detection of a spreading sequence according to the present invention.

As illustrated in FIG. 9, receiving and processing functions of the CDMA communicating means 730 may be performed by spreading sequence determining means 910 and random access channel symbol sequence determining means 920. Spreading sequence detecting means 910 detects a spreading sequence 912 from a communicated spread spectrum random access channel radiotelephone communication signal 735. Random access channel symbol sequence determining means 920 determines a random access channel symbol sequence 925 from the communicated spread spectrum random access channel signal 735.

As those skilled in the art will understand, a spread spectrum radiotelephone communications signal may represent a sequence of communications symbols which may include a convolution or other composite of several symbol sequences, including an random access channel symbol sequence representing a random access channel message, the spreading sequence by which the random access channel symbol sequence is modulated, and additional sequences imposed by other modulation or coding schemes. The symbols in these sequences may have various formats, such as the single-bit binary differential format produced by binary phase shift keying (BPSK) modulation, or multi-bit formats produced by modulation techniques such as quadrature phase shift keyed (QPSK) modulation.

Figure 10:
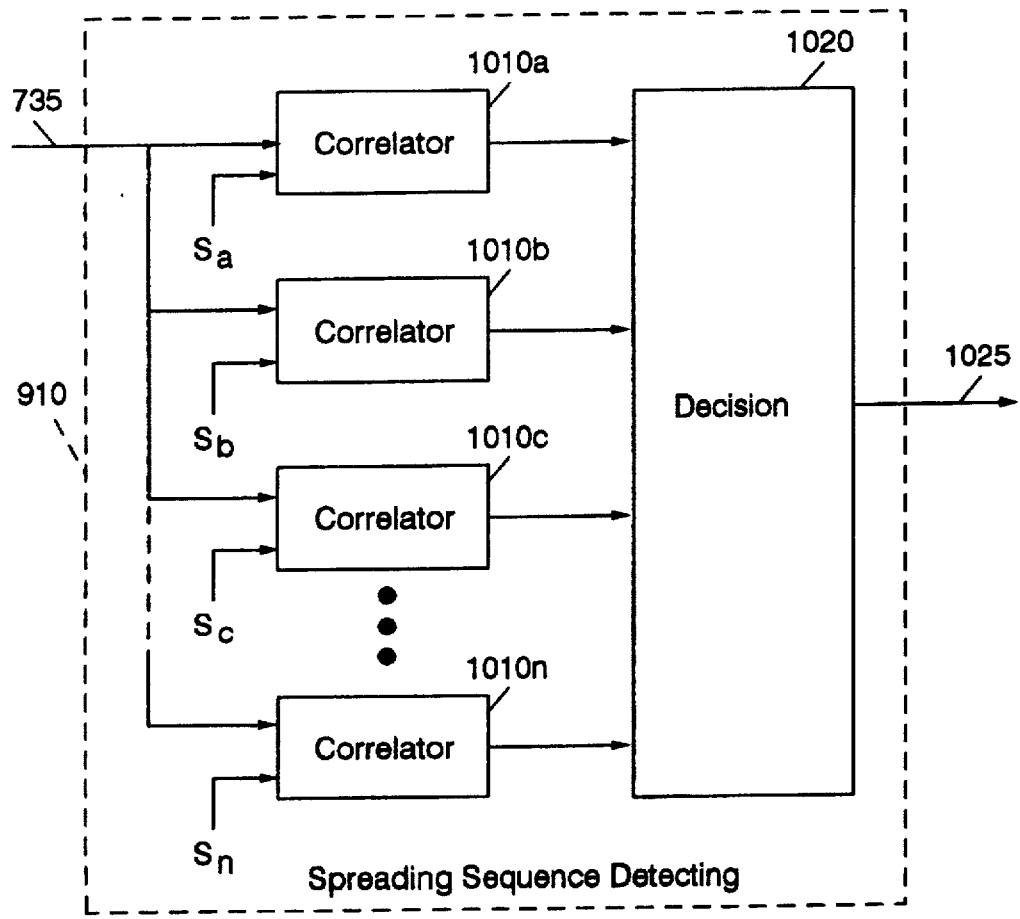
FIG. 10 illustrates detection of a spreading sequence according to the present invention.

An exemplary embodiment of spreading sequence detecting means 910 is illustrated in FIG. 10, including a plurality of parallel correlators 1010a–1010n, each of which correlate the communicated spread spectrum random access channel radiotelephone communications signal with a particular sequence $S_a$–$S_n$. Based on the outputs of the correlators 1010a–1010b, decision means 1020 may indicate a detected sequence 1025.

Correlation of a sequence of symbols with a received communications signal as illustrated in FIG. 10 may include synchronization with the spreading symbol sequence included in the random access channel symbol sequence represented by the spread spectrum random access channel radiotelephone communications signal 735. Because the spreading sequence and random access channel symbol sequence preferably are synchronized, timing for the random access channel symbol sequence may be determined without need to include a synchronization symbol sequence in the random access channel symbol sequence, i.e., the spreading sequence detection can provide the synchronization information needed to decode the information sequence representing the random access channel message. Thus, as shown for the embodiment illustrated in FIG. 9, the spreading sequence detecting means 910 may determine a sequence timing 915 associated with the detected spreading sequence. The determined sequence timing 915 may be used by random access channel information sequence determining means 920 to determine the random access channel symbol sequence 925 represented by the spread spectrum random access radiotelephone communications signal 735. Those skilled in the art will understand that eliminating the synchronization sequence in the random access channel symbol sequence may help offset an increase in message length due to spreading sequence modulation.

Figure 11:
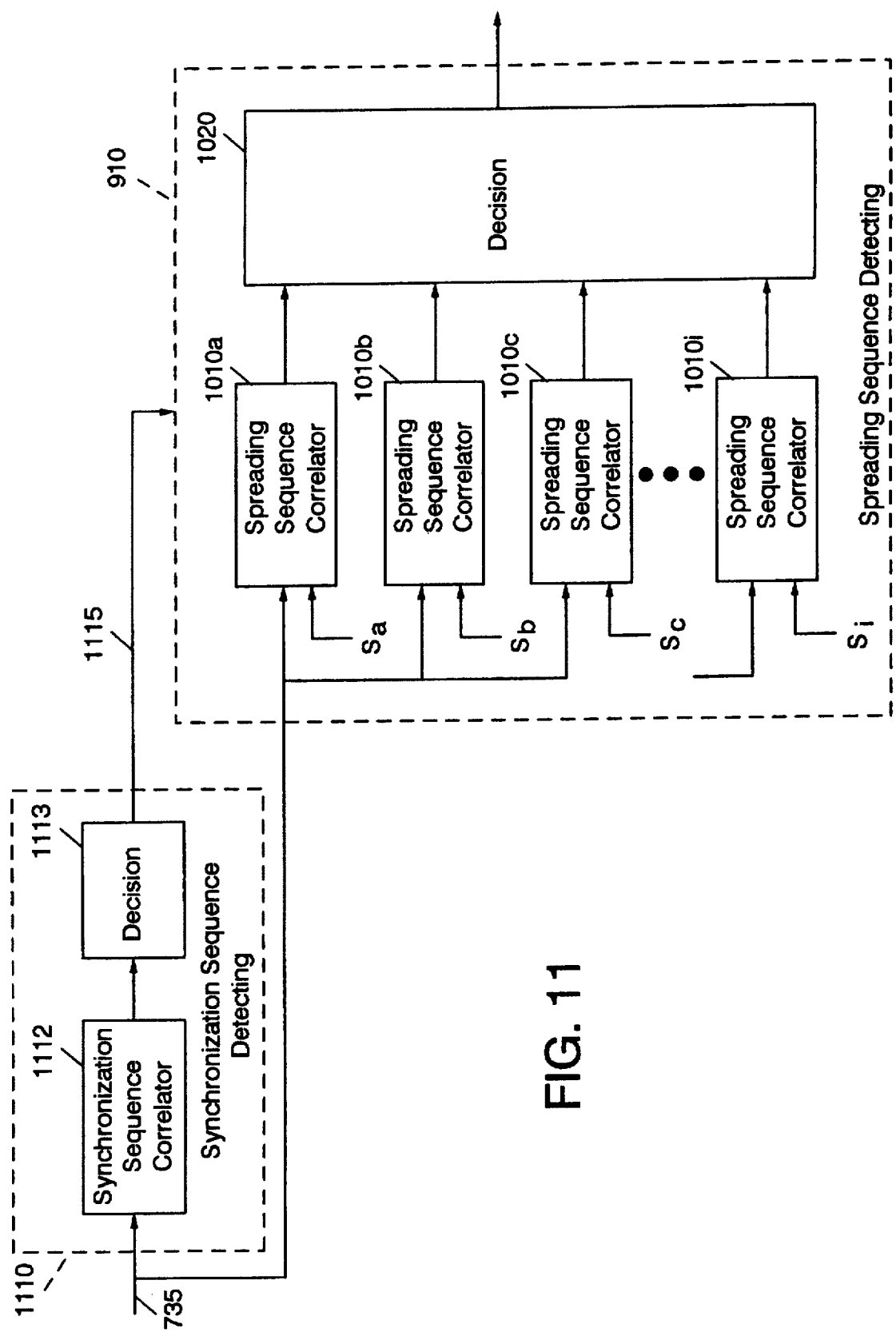
FIG. 11 illustrates two-stage detection of a spreading sequence according to the present invention.

However, if a synchronization sequence is included in the random access channel symbol sequence—for example, to be compatible with existing message formats—the synchronization sequence may be used to aid spreading sequence detection, as illustrated in FIG. 11. A predetermined synchronization sequence $Y_a$ may be associated with a subset of spreading sequences $S_a$–$S_i$ of a larger set of spreading sequences used in the radiotelephone communications system. Synchronization sequence detecting means 1110, shown as including a synchronization correlator 1112 and associated decision means 1113, may detect the presence of the predetermined synchronization sequence $Y_a$. Upon detection of the synchronization sequence $Y_a$, indicating the presence of a random access channel message, the communicated spread spectrum random access channel radiotelephone communications signal 735 may be correlated with the subset of spreading sequences $S_a$–$S_i$ associated with the detected synchronization sequence $Y_a$. This two-stage detection allows received signals to be correlated with a reduced number of spreading sequences instead of with every spreading sequence used in the system. In addition, as the synchronization sequence $Y_a$ preferably is shorter than the associated spreading sequences, a random access channel message may be more quickly and easily detected if the synchronization sequence is detected before correlation with the longer spreading sequences.

Those skilled in the art will appreciate that spreading sequence detecting means 910, random access channel symbol sequence determining means 920 and synchronization sequence detecting means 1110 may be included in a central station 710 which receives spread spectrum random access channel signals 735. However, these elements also may be distributed elsewhere in the radiotelephone communications system 700. Those skilled in the art will also understand that any or all of the spreading sequence detecting means 910, random access channel symbol sequence determining means 920, synchronization sequence detecting means 1110, and other means for performing the detecting, determining, and related steps described above may be implemented in analog or digital hardware, software running on a general purpose processor, or a combination thereof.

Figure 12A:
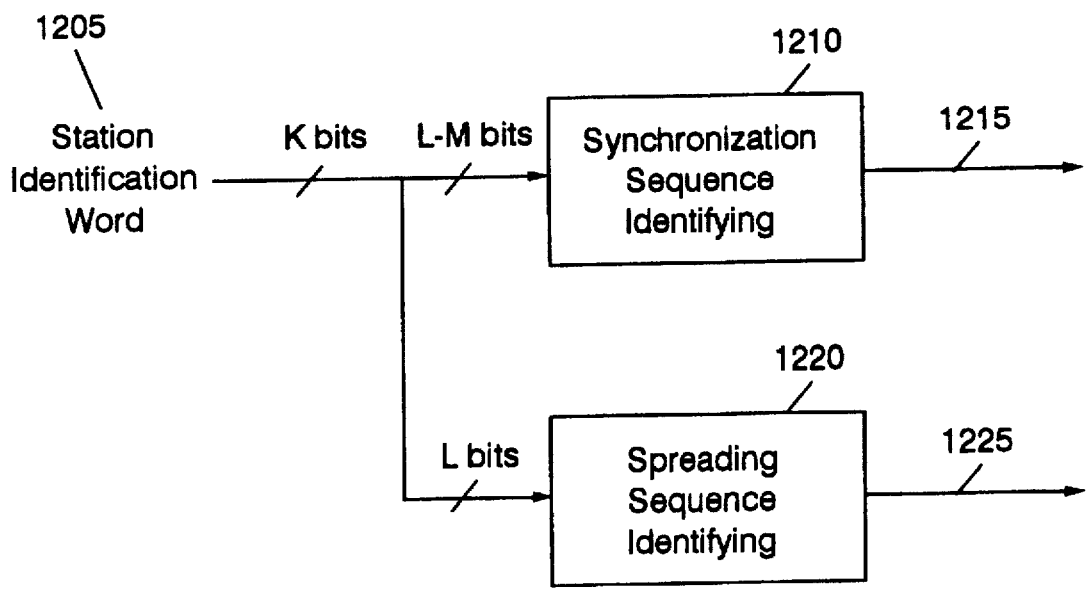
FIGS. 12A–12B illustrate generation of synchronization and spreading sequences according to the present invention.

FIG. 12A illustrates how a synchronization sequence $Y_i$ and a spreading sequence $S_i$ may be associated by generating both sequences from a common K-bit station identification word 1205. As is well-known, a radiotelephone system typically assigns a station identification to a radiotelephone using the system, with the station identification typically being either a permanent identification, such as an International Mobile Subscriber Identity (IMSI), or a session- or transaction-based identification, such as a Temporary Mobile Subscriber Identity (TMSI). The station identification is typically stored in the radiotelephone in the form of a digital station identification word. Those skilled in the art will understand that as station identifications may be randomly distributed to radiotelephones, generating spreading sequences from a station identification word can help randomize the distribution of spreading sequences around the radiotelephone system, reducing the probability that neighboring radiotelephones will be using spreading sequences sufficiently correlated to cause unacceptable interference.

As illustrated, synchronization sequence identifying means 1210 may use the lower L–M bits of the station identification word 1205 to identify a synchronization sequence $Y_i$. An associated spreading sequence $S_i$ may be identified by spreading sequence identifying means 1220, using the lower L bits of the station identification word 1205. In this manner, a synchronization sequence may be associated with $2^M$ spreading sequences. Those skilled in the art will understand that synchronization sequence identifying means 1210 and spreading sequence identifying means 1220 may be implemented in a number of ways, for example, using software look-up tables, memory arrays addressed by bits of the station identification word 1205, or sequence generators which use the station identification word 1205 as an input.

Figure 12B:
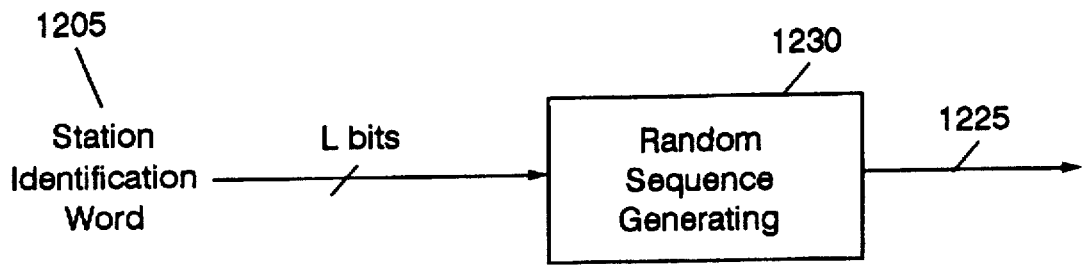

As illustrated in FIG. 12B, a spreading sequence $S_i$ may also be randomly generated from the station identification word 1205, using random sequence generating means 1230, for example, from the lowest L bits of the station identification word 1205. In this manner, the spread spectrum random access channel communications signal produced by the spreading sequence $S_i$ generally can only be despread by a receiving station producing a despreading sequence generated in the same manner from the same seed, offering enhanced security for communications in the radiotelephone system by making it more difficult for unauthorized parties to correlate a spreading sequence with a station identification. Those skilled in the art will understand that although random generation of spreading sequences may result in two radiotelephones using the same spreading sequence to produce random access channel communications signals, the correlation properties of spreading sequences make it unlikely that unacceptable interference will occur as differences in propagation delay between signals generated by two radiotelephones using the same spreading sequence will tend to reduce the correlation between the signals at received at a given receiving station. Those skilled in the art will also understand that any or all of the synchronization sequence identifying means 1210, spreading sequence identifying means 1220, random sequence generating means 1230, and other means for performing the identifying, generating and related steps described above may include analog or digital hardware, software running on a general purpose processor, or a combination thereof.

Figure 13:
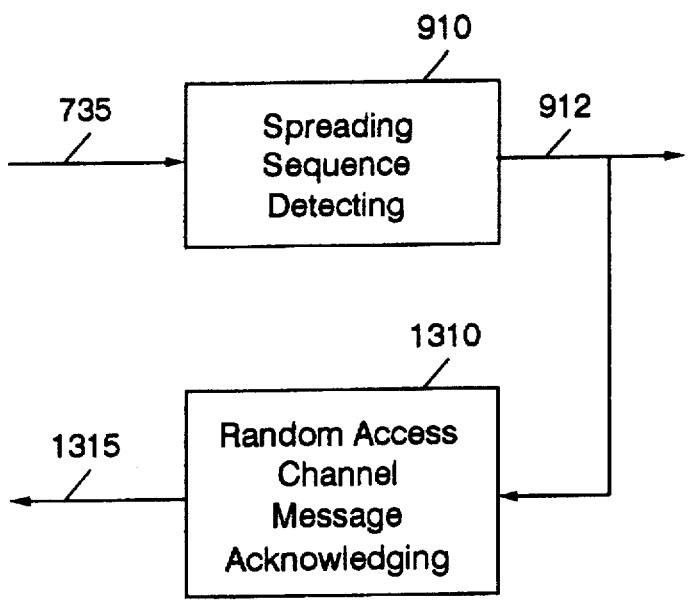
FIG. 13 illustrates acknowledgement of a random access channel message according to the present invention.

As illustrated in FIG. 13, the use of a CDMA random access channel can also eliminate the need to include a reference number in a random access channel message. As is well-known, conventional radiotelephone systems typically include a reference number in a random access channel message to serve as a tag which identifies a particular access request. According to the present invention, this tagging function may be served by the spreading sequence used to communicate the random access channel message. Spreading sequence detecting means 910 detects a spreading sequence 925 in a communicated spread spectrum random access radiotelephone communications signal 735. In response, random access channel message acknowledging means 1310 acknowledges the communication of a random access message by communicating an random access channel acknowledgement message 1315 corresponding to the detected spreading sequence 925, for example, an acknowledgement message 1315 including a reference number which corresponds to the detected spreading sequence 925.

Figure 14:
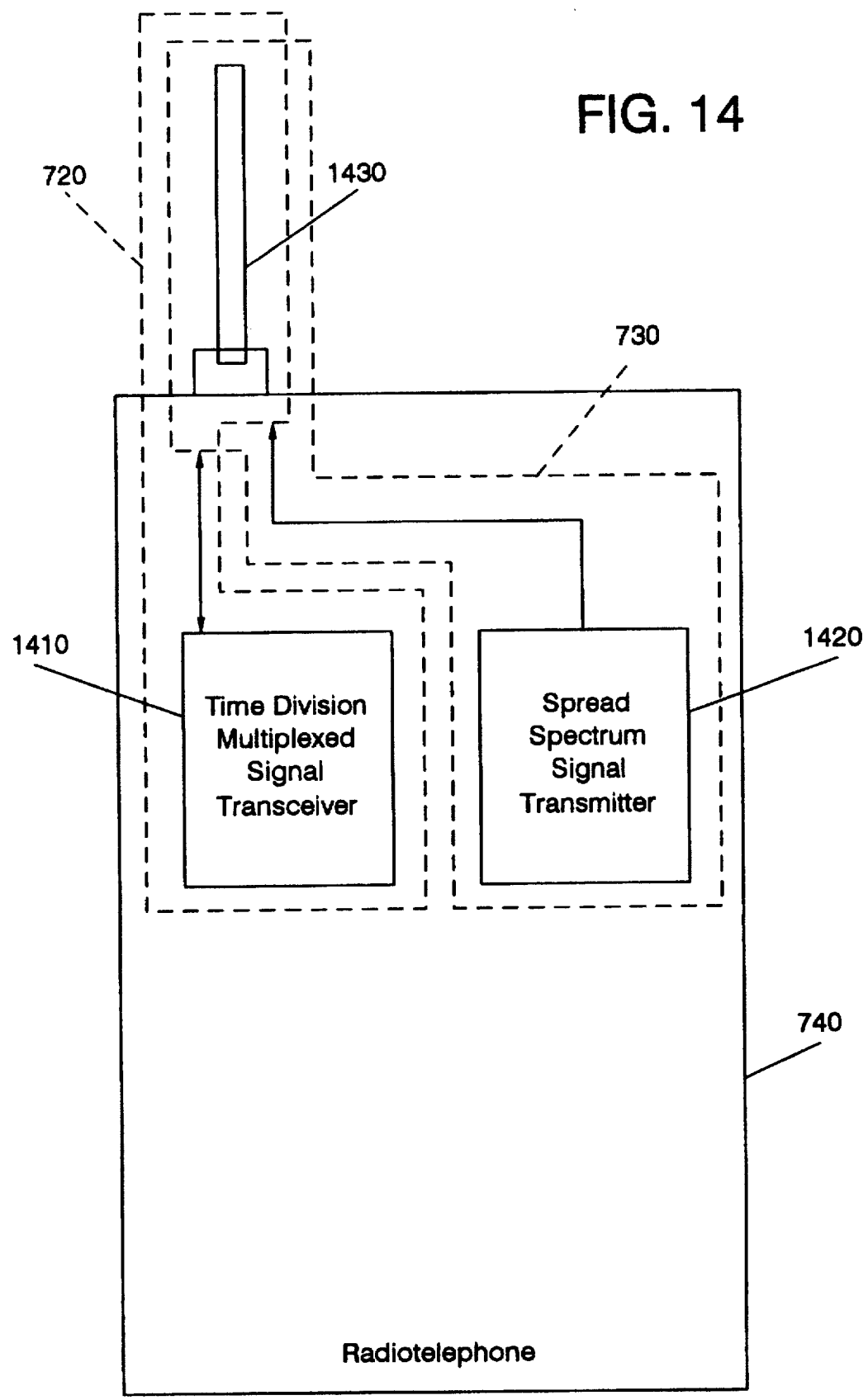
FIG. 14 illustrates a radiotelephone according to the present invention.

FIG. 14 illustrates a radiotelephone 740 for communicating with a central station 710 in a time division multiple access radiotelephone communications system 700 such as that illustrated in FIG. 7. The radiotelephone 740 includes TDMA communicating means 720 for communicating a radiotelephone communications message from the radiotelephone 740 over a time division multiplexed carrier frequency band, with the TDMA communicating means 720 here shown including a time division multiplexed signal transceiver 1410 which transmits and receives time division multiplexed signals via an antenna 1430. The radiotelephone 740 also includes CDMA random access channel communicating means 730 for communicating a random access channel message over the carrier frequency spectrum used by the system according to a spreading sequence, here illustrated as including a spread spectrum transmitter 1420 which transmits spread spectrum random access channel radiotelephone communications signals via the antenna 1430. Those skilled in the art will understand that in addition to the components illustrated, TDMA communicating means 720 and CDMA random access channel communicating means 730 may include digital signal processors, mixers, analog and digital filters and the like. It will also be understood that any or all of the TDMA communicating means 720, CDMA random access channel communicating means 730, and other means for performing the communicating and related steps described above may be implemented in analog or digital hardware, software running on a general purpose processor, or a combination thereof. Other components which may be included in the radiotelephone 740, such as a keypad, display, speaker and microphone, are not shown.

Figure 15:
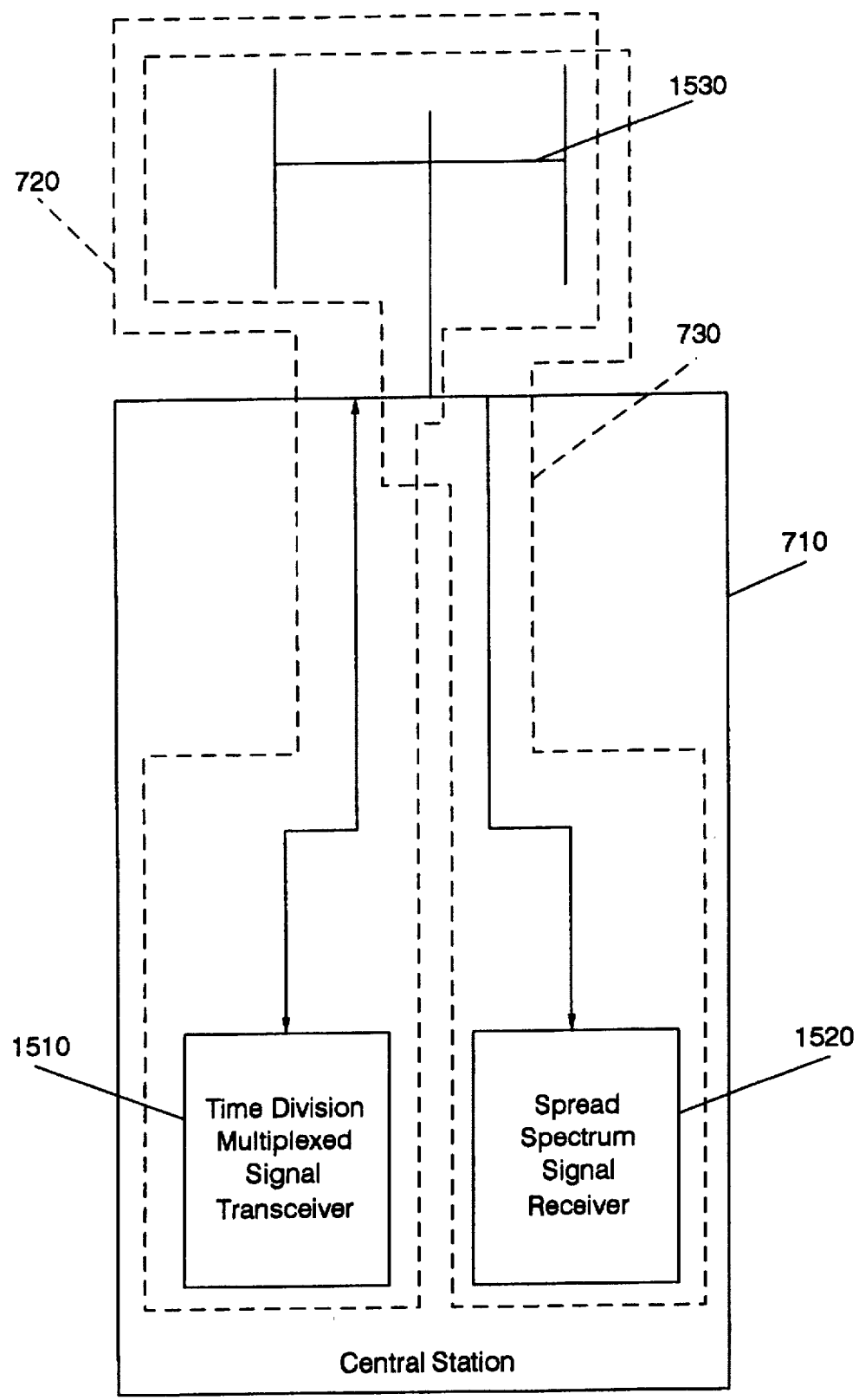
FIG. 15 illustrates a central station according to the present invention.

FIG. 15 illustrates components of a central station 710, such as a cellular base station or satellite, for communicating with a radiotelephone 740 such as the one illustrated in FIG. 13. The central station 710 includes TDMA communicating means 720 for communicating a radiotelephone communications message to or from the radiotelephone 710 over a time division multiplexed carrier frequency band, with the TDMA communicating means 720 here shown including a time division multiplexed signal transceiver 1510 which transmits and receives time division multiplexed signals via an antenna 1530. The central station 710 also includes CDMA random access channel communicating means 730 for communicating a random access channel message over the carrier frequency spectrum used by the system according to a spreading sequence, here illustrated as including a spread spectrum receiver 1520 which receives spread spectrum random access channel radiotelephone communications signals via the antenna 1530. Those skilled in the art will understand that in addition to the components illustrated, TDMA communicating means 720 and CDMA random access channel communicating means 730 may include digital signal processors, mixers, analog and digital filters and the like. It will also be understood that any or all of the TDMA communicating means 720, CDMA random access channel communicating means 730, and other means for performing the communicating and related steps described above may be implemented in analog or digital hardware, software running on a general purpose processor, or a combination thereof. Other components which may be included in the central station 710, such as power supplies, control electronics, and equipment for interfacing with a Mobile Telephone Switching Office (MTSO), are not shown.

Figure 16:
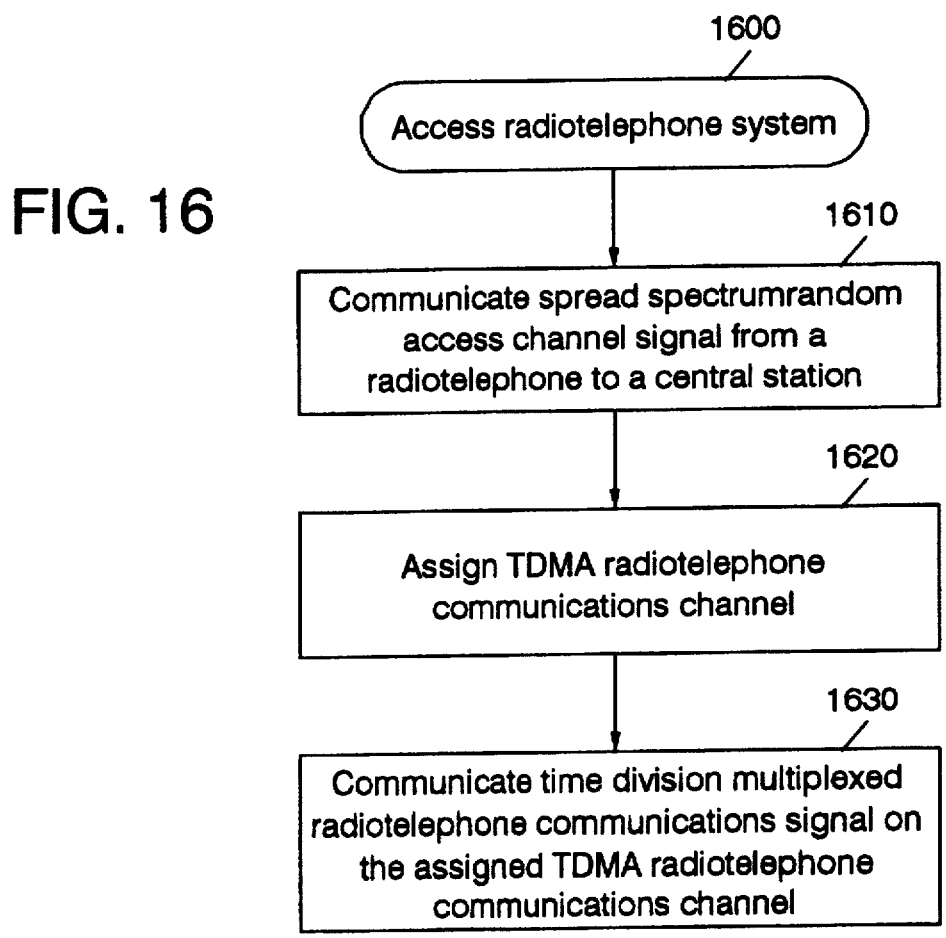
FIG. 16 illustrates operations for accessing a TDMA radiotelephone communications system according to the present invention.

Operations for accessing a TDMA radiotelephone communications system according to the present invention are illustrated in FIG. 16 (Block 1600). A spread spectrum random access channel signal, representing a random access channel message, is communicated from a radiotelephone to a central station, over a carrier frequency spectrum according to a spreading sequence (Block 1610). In response, a TDMA radiotelephone commutations channel is assigned to the radiotelephone (Block 1620). A time division multiplexed radiotelephone communications signal, representing a radiotelephone communications message, is then communicated between the radiotelephone and the central station on the assigned TDMA radiotelephone communications channel, over a time division multiplexed carrier frequency band of the carrier frequency spectrum used by the system (Block 1630).

In the drawings and specification, there have been disclosed typical embodiments of the invention and, although specific terms are employed, they are used in a generic and descriptive sense only and not for purposes of limitation, the scope of the invention being set forth in the following claims.

That which is claimed:

1. A time division multiple access radiotelephone communications system for communicating between at least one central station and at least one radiotelephone over a carrier frequency spectrum, the system comprising:

code division multiple access (CDMA) random access channel communicating means for communicating a spread spectrum random access channel signal from a radiotelephone to a central station over the carrier frequency spectrum according to a spreading sequence, said spread spectrum random access channel signal representing a random access message; and time division multiple access (TDMA) communicating means for communicating a time division multiplexed radiotelephone communications signal between said radiotelephone and said central station over a time division multiplexed carrier frequency band of the carrier frequency spectrum, said time division multiplexed radiotelephone communications signal representing a radiotelephone communications message;

wherein said CDMA random access channel communicating means comprises:

means for associating a synchronization sequence with a plurality of spreading sequences;

means for communicating a spread spectrum random access channel signal representing a random access channel symbol sequence representing a random access channel message and including a synchronization sequence, according to one of the plurality of spreading sequences associated with said synchronization sequence;

synchronization sequence detecting means, responsive to said means for communicating a spread spectrum random access channel signal representing a random access channel symbol sequence, for detecting a synchronization sequence from a communicated spread spectrum random access channel signal; and spreading sequence detecting means, responsive to said synchronization sequence detecting means and to said means for communicating a spread spectrum random access channel signal representing a random access channel symbol sequence, for detecting one of the plurality of predetermined spreading sequences associated with a detected synchronization sequence, from the communicated spread spectrum random access channel signal;

said system further including means for assigning a station identification to said radiotelephone, and wherein said means for associating a synchronization sequence with a plurality of spreading sequences comprises:

synchronization sequence identifying means, responsive to said means for assigning a station identification, for identifying a synchronization sequence from the assigned station identification; and spreading sequence identifying means, responsive to said means for assigning a station identification, for identifying a spreading sequence from the assigned station identification.

2. A system according to claim 1 wherein said station identification comprises a station identification word, and:

wherein said spreading sequence identifying means comprises means for identifying a spreading sequence from a group of bits of said station identification word; and wherein said synchronization sequence identifying means comprises means for identifying a synchronization sequence from a subset of said group of bits of said station identification word.

3. A method of accessing a time division multiple access (TDMA) radiotelephone communications system, the method comprising the steps of:

communicating a spread spectrum random access channel signal from a radiotelephone to a central station over a carrier frequency spectrum according to a spreading sequence, the spread spectrum random access channel signal representing a random access message;

assigning a TDMA radiotelephone communications channel to the radiotelephone, in response to communication of the spread spectrum random access channel signal; and communicating a time division multiplexed radiotelephone communications signal between the radiotelephone and the central station on the assigned TDMA radiotelephone communications channel, over a time division multiplexed carrier frequency band of the carrier frequency spectrum, the time division multiplexed radiotelephone communications signal representing a radiotelephone communications message;

wherein said step of communicating a random access channel message is preceded by the step of associating a synchronization sequence with a plurality of spreading sequences, wherein said step of communicating a spread spectrum random access channel signal comprises the step of communicating a spread spectrum random access channel signal representing a random access channel symbol sequence including the synchronization sequence and an information sequence corresponding to the random access channel message, according to one of the plurality of spreading sequences associated with the synchronization sequence; and wherein said step of communicating a spread spectrum random access channel signal is followed by the steps of:

detecting a synchronization sequence from the communicated spread spectrum random access channel signal; and detecting one of the plurality of predetermined spreading sequences associated with the detected synchronization sequence from the communicated spread spectrum random access channel signal; and wherein said step of communicating a random access channel message is preceded by the step of assigning a station identification to the radiotelephone, and wherein said step of associating a synchronization sequence with a plurality of spreading sequences comprises the steps of:

identifying a synchronization sequence from the assigned station identification; and identifying a spreading sequence from the assigned station identification.

4. A method according to claim 3 wherein the station identification comprises a station identification word, and:

wherein said step of identifying a spreading sequence comprises the step of identifying a spreading sequence from a group of bits of the station identification word; and wherein said step of identifying a synchronization sequence identifying comprises the step of identifying a synchronization sequence from a subset of the group of bits of the station identification word.

* * * * *